United States Patent

Jeong

[11] Patent Number: 6,130,988
[45] Date of Patent: Oct. 10, 2000

[54] DIGITAL VIDEO DISK PLAYER AND REPRODUCTION CONTROL METHOD THEREOF

[75] Inventor: Jeong-joo Jeong, Suwon, Rep. of Korea

[73] Assignee: Samsung Electronics Co., Ltd., Kyungki-do, Rep. of Korea

[21] Appl. No.: 08/883,435

[22] Filed: Jun. 26, 1997

[30] Foreign Application Priority Data

Jun. 28, 1996 [KR] Rep. of Korea ............... 96-25205

[51] Int. Cl.[7] ............................................ H04N 5/781
[52] U.S. Cl. ................................. 386/125; 386/126
[58] Field of Search ....................... 386/4, 52, 55, 386/64, 96, 95, 68, 125–126; 345/328; 360/13; 369/83, 32, 60; 711/4, 5; 370/509

[56] References Cited

U.S. PATENT DOCUMENTS

| | | | |
|---|---|---|---|
| 5,576,844 | 11/1996 | Anderson et al. | 386/52 |
| 5,671,204 | 9/1997 | Yokouchi et al. | 369/60 |
| 5,712,949 | 1/1998 | Kato et al. | 386/96 |
| 5,715,354 | 2/1998 | Iwamura et al. | 386/68 |
| 5,872,750 | 2/1999 | Satoh | 369/32 |
| 5,930,450 | 6/1999 | Fujita | 386/95 |
| 5,960,006 | 9/1999 | Maturi et al. | 370/509 |

FOREIGN PATENT DOCUMENTS

| | | |
|---|---|---|
| 8-203246 | 8/1996 | Japan . |
| 8-214265 | 8/1996 | Japan . |

*Primary Examiner*—Thai Tran
*Attorney, Agent, or Firm*—Sughrue, Mion, Zinn, Macpeak & Seas, PLLC

[57] ABSTRACT

An optical disk playback control device in which a signal reproducing portion controls a servo of a digital video disk and reproduces a signal. A data processor demodulates and error-corrects data generated from the signal reproducing portion and processes the error-corrected data according to playback control information. A decoder generates and outputs audio and video data by decoding the data in the data processor. A system microcontroller receives a user's key input signal and applies a control signal to the signal reproducing portion to reproduce the data on a disk, and applies reproduction control to the data processor and the decoder. A memory has a first storage area which is used for demodulation and error correction by the data processor, a second storage area for storing data demodulated and error-corrected in the first storage area and a third storage area for storing playback control information which controls the data of the second storage area, so that the playback control information of the third storage area is read and written by the system microcontroller.

8 Claims, 4 Drawing Sheets

DIGITAL VIDEO DISK PLAYER AND REPRODUCTION CONTROL METHOD THEREOF

BACKGROUND OF THE INVENTION

1. Field of the Invention

The present invention relates to an optical disk reproducing apparatus, and more particularly, to a digital video disk (DVD) player and a reproduction control method thereof. The present invention is based on Korean Application No. 96-25205, which is incorporated herein by reference.

2. Description of the Related Art

Generally, a digital video disk (DVD) is a storage medium for storing image and audio information. The data stored in the digital video disk may be categorized into two types: presentation data and navigation data. The presentation data is compressed audio and video data. The navigation data is control information used to reproduce the presentation data. The control information may be the sequence in which the presentation data recorded on the disk is to be played, for example.

A digital video disk player can perform an interactive playback in which a user can communicate with the player during playback. On the other hand, a conventional video cassette recorder or compact disk player can only perform simple playback.

Accordingly, a system microcontroller which controls the DVD player reads playback control information from a disk and stores the information in a buffer memory. The system microcontroller subsequently reproduces the audio and video data on the disk, with reference to the stored playback control information as needed.

However, when the playback control information stored in the buffer memory is to be used in the conventional DVD player, the playback control information must be transferred to another memory controlled by the system microcontroller. Furthermore, since the conventional system microcontroller has an internal memory of very small capacity, an additional external memory is generally used. When this external memory is used, the number available ports of the system microcontroller is reduced. As a result, a device such as an expander must be used in addition to the external memory, thereby increasing costs.

SUMMARY OF THE INVENTION

Accordingly, one object of the present invention is to provide a digital video disk player which stores playback control information in a memory for data processor use rather than in an external memory, so that a system controller can directly read the playback control information directly to control the DVD player.

Another object of the present invention is to provide a reproduction control method of a digital video disk player which stores playback control information in a specific area of a memory for data processor use, and reads the control information.

To accomplish one of the objects above, there is provided an optical disk playback control device comprising: a signal reproducing portion for controlling a servo of a digital video disk and reproducing a signal; a data processor for demodulating and error-correcting data generated from the signal reproducing portion and processing the error-corrected data according to playback control information; a decoder for generating and outputting audio and video data by decoding the data in the data processor; a system controller for receiving a user's keypress signal and applying a control signal to the signal reproducing portion to reproduce the data on a disk, and applying reproduction control to the data processor and the decoder; and storage means having a first storage area which is used for demodulation and error correction by the data processor, a second storage area for storing data demodulated and error-corrected in the first storage area and a third storage area for storing playback control information which controls the data of the second storage area, wherein the playback control information of the third storage area is read and written by the system controller.

To accomplish another one of the objects above, there is provided an optical disk playback controlling method in a digital video disk playback controlling method to play a digital video disk on which there is volume information as positional information with respect to each file recorded on a disk, video title sets where video data to be reproduced is divided into titles of predetermined sizes, and a video manager file storing reproduction information with respect to the video title sets are recorded by including a memory having a plurality of areas. The method comprises the steps of: (a) reading the volume information during playback of a disk and storing the result in a particular area of the memory; (b) reading information on the positions of the video manager file and the video title sets from the volume information in the step (a) and storing the read video manager file information in a particular area of the memory; (c) detecting the position of menu video data from the video manager file information of the step (b) to produce a menu; (d) if a specific title is selected in the menu of the step (c), detecting the position of the video title set having the selected title from the video manager file information and storing the result in another particular area of the memory; (e) detecting video title set information from the position of the video title set in the step (d) and reproducing the menu; and (f) reproducing predetermined data selected in the video title set menu of the step (e).

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1A:
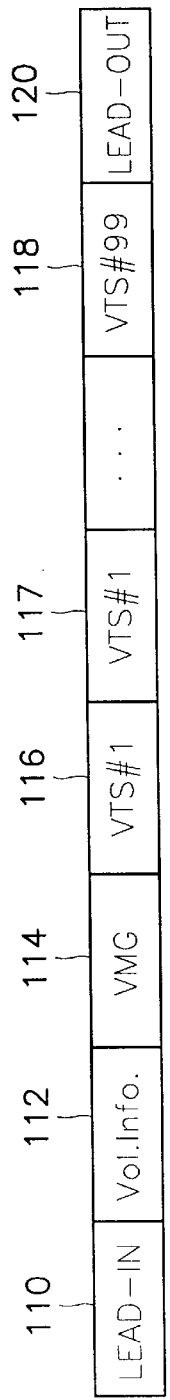
FIG. 1A illustrates a data format of a typical digital video disk.

As shown in FIG. 1A, a data format of a typical digital video disk includes a lead-in area 110, a lead-out area 120, a volume information area 112 in which positional information on areas of each of files VMG, VTS#1, . . . , VTS#99 on the disk is recorded, a video manager file (VMG) area 114 in which playback control information for video title sets (VTS#1, . . . ,VTS#99) on the digital video disk, menu video data, and menu control information are stored, and video title set (VTS#1, . . . ,VTS#99) areas 116, 117 and 118 in which video data is recorded.

Figure 1B:
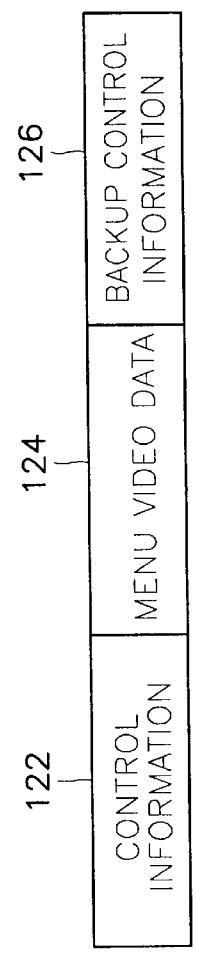
FIG. 1B illustrates a data format of a video manager file (VMG) area 114 of FIG. 1A.

FIG. 1B illustrates in detail the data format of the video manager file (VMG) area 114 of FIG. 1A. The video manager file (VMG) area 114 is divided into a control information area 122, a menu video data area 124, and a backup control information area 126.

The control information area 122 has positional information and playback information of the video title sets (VTS) recorded on a disk, and menu playback information. The menu video data area 124 has video and audio data of a still picture or a moving picture of MPEG standard which is displayed on a screen when a menu is to be shown. The backup control information area 126 stores backup information to be used when the control information stored in the control information area 122 is damaged.

Since the size of each file is changed depending on the complexity of the disk when the disk is manufactured, the size of the memory required by the system microcontroller is usually different for each disk.

Figure 1C:
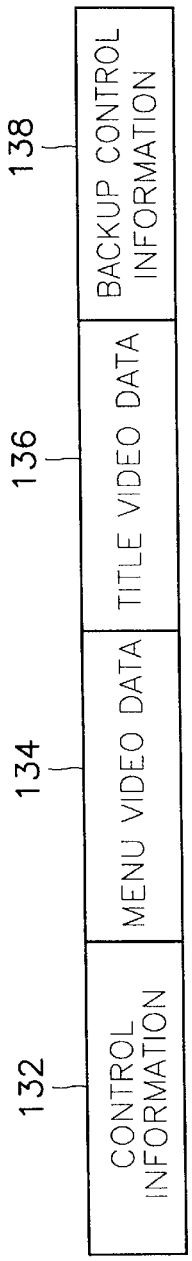
FIG. 1C illustrates a data format of a video title set (VTS) area of FIG. 1A.

FIG. 1C shows in detail the video title set areas (VTS#1, . . . , VTS#99) 116, 117 and 118 of FIG. 1A. Each of the VTS areas 116, 117 and 118 is comprised of a control information area 132, a menu video data area 134, a title video data area 136, and a backup control information area 138.

The control information area 132 stores control information such as the playback sequence of the video title sets (VTS). The menu video data area 134 stores a still picture or a video of MPEG standard and audio data of AC-3 standard to be output through a screen or a loudspeaker when a menu is to be shown. The title video data area 136 stores a still picture or MPEG video data and AC-3 audio data of the video title set. The backup control information area 138 stores backup information to be used when the control information stored in control information area 132 is damaged.

The control information file in the control information area 132 of FIG. 1C must be accessible by the system microcontroller during a playback of the corresponding video title set (VTS), or be read again from the disk as needed. Also, since the size of each information area is different depending on the complexity of the VTS, the memory size required by the system microcontroller memory is usually different for each VTS.

Figure 2:
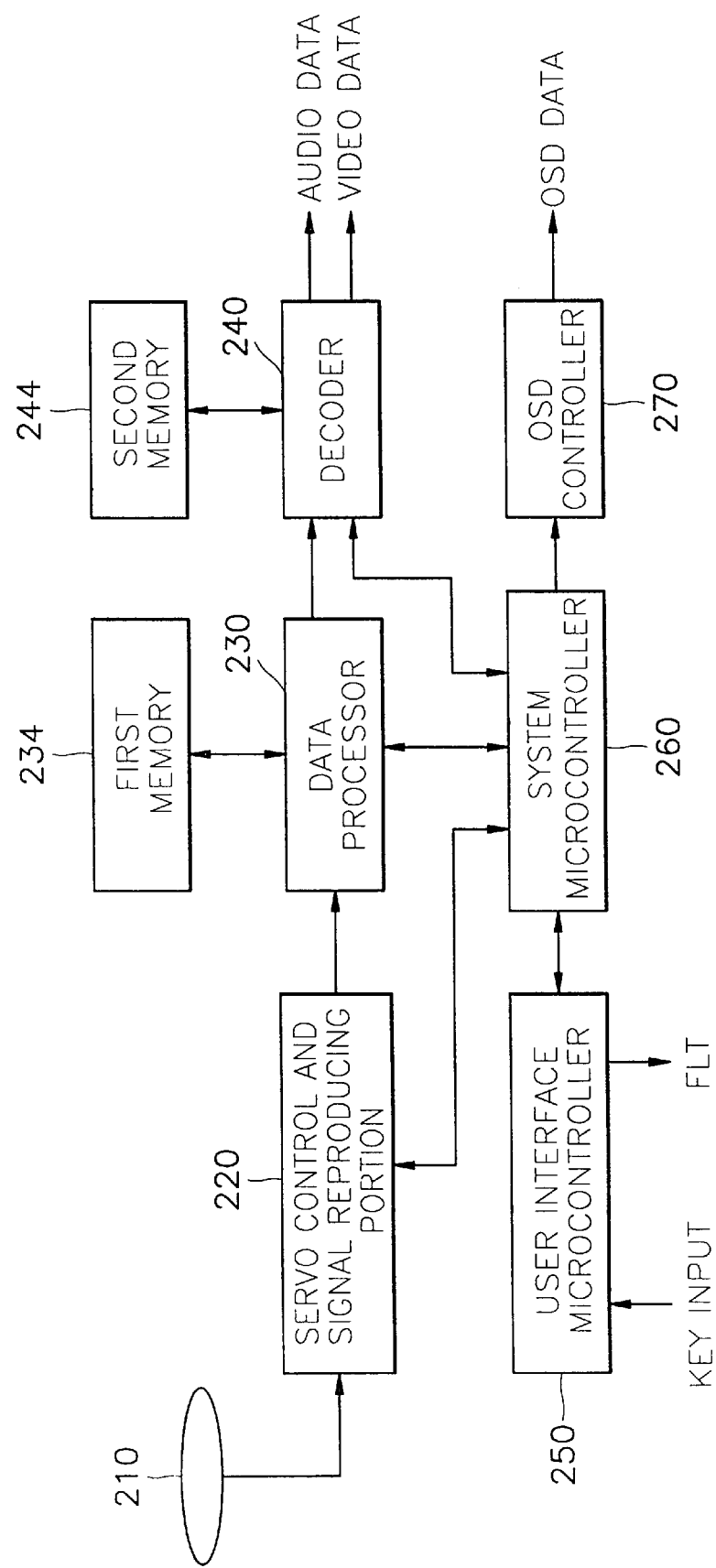
FIG. 2 is a block diagram of a digital video disk player according to the present invention.

FIG. 2 is a block diagram of a digital video disk player according to the present invention. In FIG. 2, a servo control and signal reproducing portion 220 amplifies the radio frequency (RF) signal read out from the disk 210, analog-to-digital converts the amplified signal, and quantizes the digital signal to output an EFM (eight-to-fourteen modulation or eight-to-fifteen modulation) signal. The servo control and signal reproducing portion 220 also generates a servo control signal to control servos of the digital video disk player of FIG. 2.

A data processor 230 carries out demodulation and error-correction decoding of the EFM signal output by the servo control and signal reproducing portion 220, and transmits the error-corrected data to a decoder 240 according to a control signal output by the system microcontroller 260. The data processor 230 also writes and reads playback control information among the EFM signal to and from the first memory 234, in response to a control signal from the system microcontroller 260.

The playback control information shown in FIGS. 1A, 1B and 1C is of significant size, which is not constant. Accordingly, the system microcontroller 260 stores the playback information read out from the VMG area 114 of FIG. 1A and the VTS areas 116, 117 and 118 of FIG. 1C in the first memory 234 so that they can be accessed at any time during playback of the disk.

Figure 3:
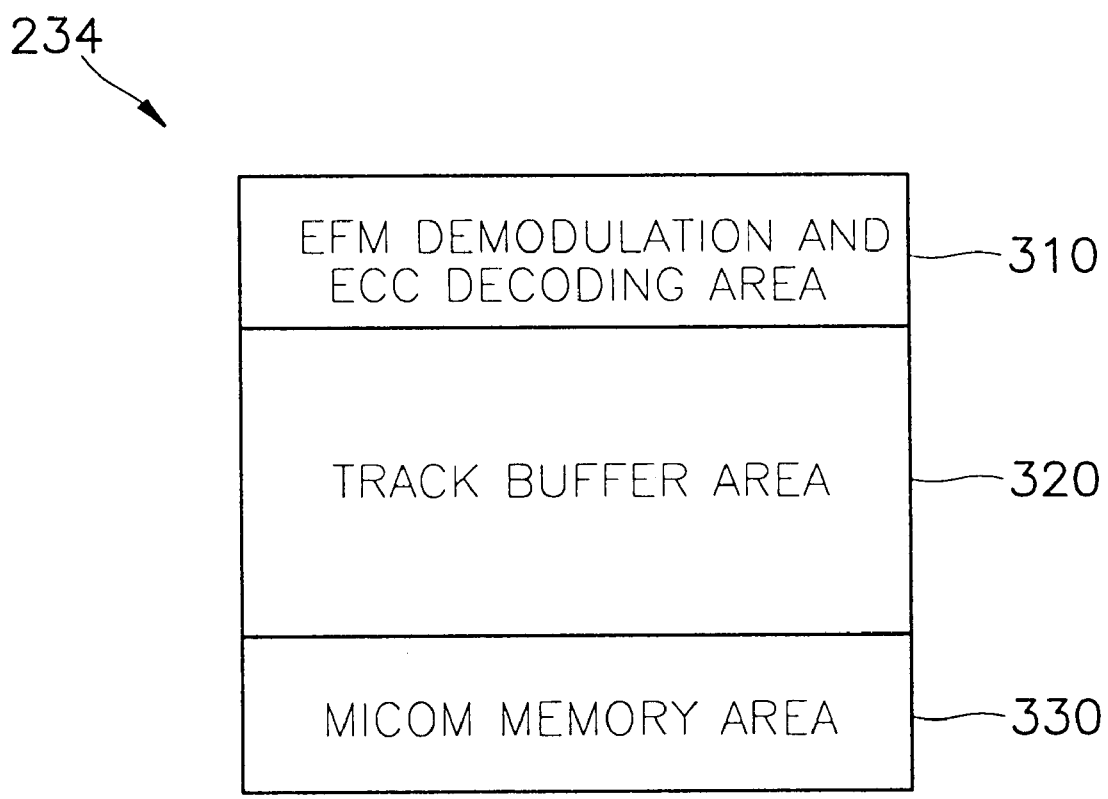
FIG. 3 shows a memory map of a first memory 234 of FIG. 2.

As shown in FIG. 3, the first memory 234 is divided into an EFM demodulation and ECC decoding area 310, a track buffer area 320 and a micom memory area 330. The area 310 is used when the data processor 230 carries out the EFM demodulation of the EFM data, which includes the video data and the control information, and ECC (error correction coding) decoding of EFM demodulated data. The track buffer area 320 stores the ECC decoded data. The micom memory area 330 stores the decoded playback control information which is used by the system microcontroller 260. The size of the micom memory area 330 may be set and changed by the system microcontroller 260.

During playback, since the decoded playback control information read from the disk is written to the micom memory area 330 of the first memory 234 instead of being moved to a separate memory, the system microcontroller 260 may access the control information whenever the control information is needed.

A decoder 240 decodes an audio, video and sub-picture data stream output by the data processor 230 under the control of the system microcontroller 260, and outputs the result as an audio signal, a video signal and a sub-picture signal. The second memory 244 temporarily stores the video data stream of MPEG standard, an audio data stream of AC-3 standard and a sub-picture stream which are to be decoded by the decoder 240.

A user interface microcontroller 250 receives key input signals from a front panel of the DVD player or a remote controller, and transfers the key input information to the system microcontroller 260. The user interface microcontroller 250 also displays playback information corresponding to the key input signal on a display device (not shown) such as an FLT, etc.

The system microcontroller 260, which controls the overall operation of the system, receives the key input information from the user interface microcontroller 250 and outputs control signals to control the servo control and signal reproducing portion 220, the data processor 230, the decoder 240 and the OSD (on screen display) controller 270. The OSD controller 270 generates OSD data corresponding to the OSD control signal output by the system microcontroller 260.

Figure 4:
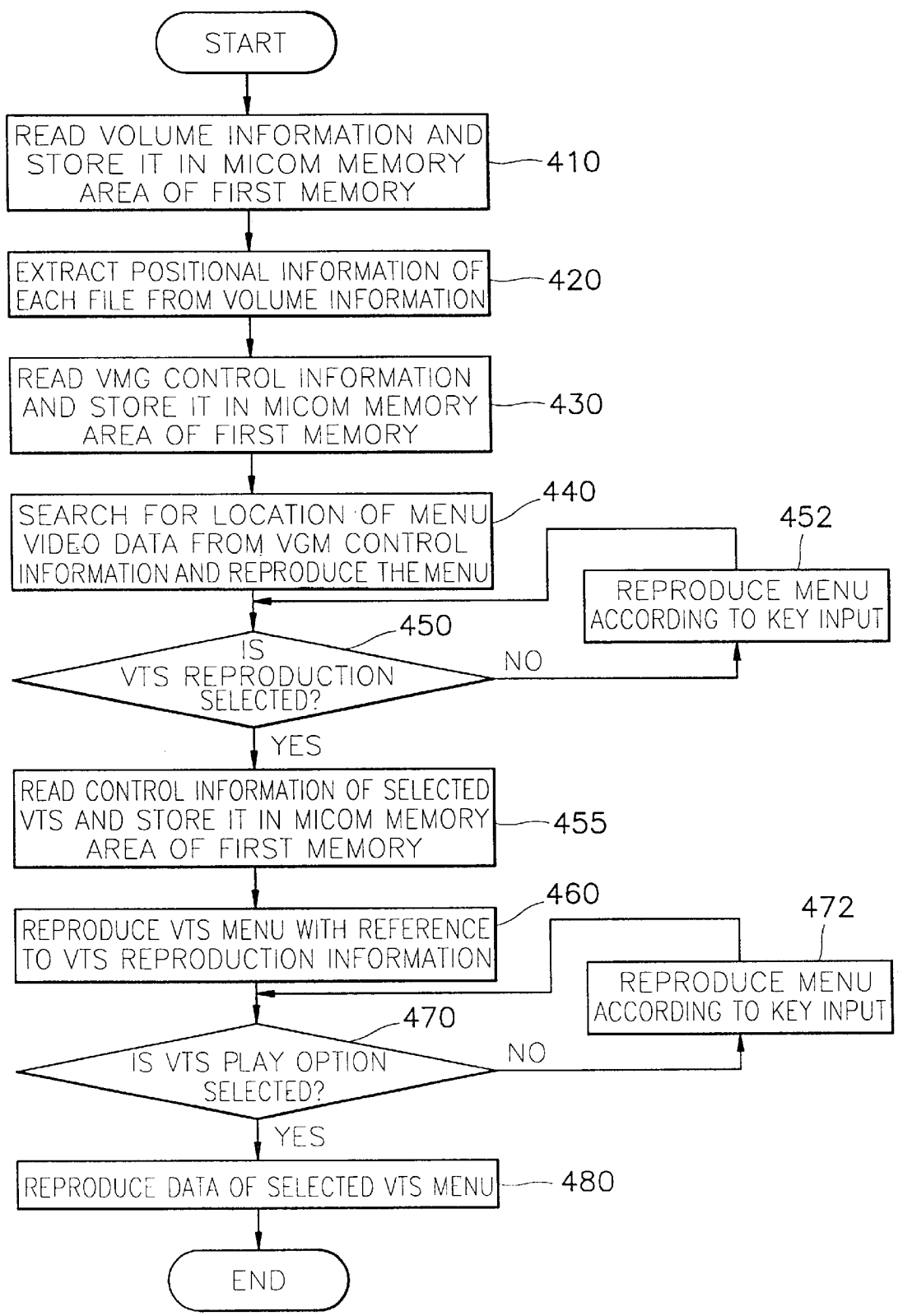
FIG. 4 is a flowchart illustrating a method of controlling the playback of an optical disk in the apparatus of FIG. 2.

Now, a method of controlling the playback of an optical disk in the apparatus of FIG. 2 will be described with reference to FIG. 4.

When a digital video disk 210 is loaded, volume information 112 of FIG. 1A is read by the servo control and signal reproducing portion 220. The servo control and signal reproducing portion 220 stores demodulated and error-corrected data in the EFM demodulation and ECC decoding area 310 of the first memory 234 through the data processor 230 and stores demodulated data in the track buffer area 320. The system microcontroller 260 reads the volume information stored in the track buffer area 320 of the first memory via the data processor 230 and detects a start position of the VMG and VTS#1 . . . VTS#99, in step 410.

Also, the system microcontroller 260 transfers a write pointer to the micom memory area 330 and stores the VMG control information extracted by the positional information of the VMG and VTS#1 . . . VTS#99 in the micom memory area 330, in step 430. A start position of the menu video data 124 of FIG. 1B is searched for by analyzing the VMG control information, and the VMG menu is reproduced, in step 440. When a menu starts being reproduced, a user selects a title from a screen, and when a particular title is selected, the system microcontroller 260 detects a VTS position where the title exists from the VMG and reads control information of a corresponding VTS in the same mariner as in step 430.

The system microcontroller 260 determines whether a VTS was indicated by a user, in step 450. When a VTS was indicated, the control information 132 of the corresponding VTS is read and stored at a position different from the VMG in the micom memory area 330 of the first memory 234, in step 455. When the VTS was not indicated, a menu is continuously reproduced by a key selected by a user, in step 452. Accordingly, the system microcontroller 260 analyzes the VTS control information 132 and reproduces a VTS menu, in step 460. Here, a user can select the desired program, the desired audio channel, the desired subtitle language and the desired camera angle using a menu on a screen.

The system microcontroller 260 determines whether a VTS play function was selected, in step 470. If the VTS play function was selected in step 470, the program, video, audio, or subpicture of the selected VTC menu is reproduced in step 480. Otherwise, the menu reproduction is continued according to key inputs in step 472.

If the user provides a key input signal to reproduce other titles or change the audio or subpicture channel even during reproduction, the system microcontroller 260 continues control to reproduce the desired video stream with reference to the control information. Also, if the user wants to return to a VTS menu or VMG menu before or after a program being currently reproduced is finished, the system microcontroller 260 reproduces the menu with reference to corresponding control information.

As described above, according to the present invention, the playback control information is stored in the buffer memory and the system microcontroller controls the DVD player using this information. Therefore, an additional memory for storing the playback control information and for performing the transferring operation is obviated.

While only certain embodiments of the invention have been specifically described herein, it will apparent that numerous modifications may be made thereto without departing from the spirit and scope of the invention.

What is claimed is:

1. A digital video disk (DVD) player comprising:

a signal reproducing portion for controlling servos of said digital video disk player and reproducing a signal DVD format recorded on a disk to generate EFM data;

a data processor for demodulating and error-correction decoding the EFM data output by said signal reproducing means;

a decoder for decoding the error-correction decoded data to generate audio and video data;

a system controller for controlling said signal reproducing portion, said data processor and said decoder according to a key input signal input by a user and a reproduction control signal read out from the disk; and storage means having a first storage area used for demodulation and error correction by said data processor, a second storage area for buffering data demodulated and error-corrected by said data processor, and a third storage area for storing the playback control information used for controlling reproduction of data in said second storage area.

2. A digital video disk player as claimed in claim 1, wherein the sizes of said storage areas are set by said system controller.

3. A digital video disk player as claimed in claim 1, further comprising a user interface controller for receiving key input information from a key input, and transferring the key input information to said system controller.

4. A digital video disk player as claimed in claim 1, further comprising an OSD controller for generating OSD data corresponding to an OSD control signal output by said system controller.

5. A digital video disk (DVD) player comprising:

a servo control and signal reproducing portion for reproducing a DVD format signal recorded on a video disk to generate EFM data and output the EFM data and a signal for controlling servos of said digital video disk player;

a data processor for demodulating and error-correction decoding the EFM data output by said servo control and signal reproducing portion, and outputting error-correction decoded data;

a decoder for decoding the error-correction decoded data output from said data processor to generate audio and video data;

a system controller for controlling said servo control and signal reproducing portion, said data processor and said decoder according to a key input signal input by a user and a reproduction control signal read out from the disk;

a first memory directly linked to said data processor, having a first storage area used for demodulation and error correction by said data processor, a second storage area for buffering data demodulated and error-corrected by said data processor in said first storage area, and a third storage area for storing the playback control information used for controlling reproduction of data in said second storage area by said data processor; and a second memory directly linked to said decoder for temporarily storing the error-correction decoded data input to said decoder from aid data processor.

6. A digital video disk player as claimed in claim 5, wherein the sizes of said storage areas are set by said system controller.

7. A digital video disk player as claimed in claim 5, further comprising a user interface controller for receiving key input information from a key input, and transferring the key input information to said system controller.

8. A digital video disk player as claimed in claim 5, further comprising an OSD controller for generating OSD data corresponding to an OSD control signal output by said system controller.

* * * * *